US012749685B2

(12) United States Patent
Oshima et al.

(10) Patent No.: US 12,749,685 B2
(45) Date of Patent: Sep. 29, 2026

(54) ELECTRODE AND BATTERY

(71) Applicant: Panasonic Intellectual Property Management Co., Ltd., Osaka (JP)

(72) Inventors: Tatsuya Oshima, Osaka (JP); Seiji Nishiyama, Osaka (JP); Akira Kawase, Osaka (JP); Yusuke Nishio, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 522 days.

(21) Appl. No.: 18/495,796

(22) Filed: Oct. 27, 2023

(65) Prior Publication Data

US 2024/0063392 A1 Feb. 22, 2024

Related U.S. Application Data

(63) Continuation of application No. PCT/JP2022/017374, filed on Apr. 8, 2022.

(30) Foreign Application Priority Data

May 27, 2021 (JP) ................................ 2021-089547

(51) Int. Cl.
*H01M 4/62* (2006.01)
*H01M 4/02* (2006.01)
(Continued)

(52) U.S. Cl.
CPC ........... *H01M 4/622* (2013.01); *H01M 4/525* (2013.01); *H01M 4/663* (2013.01); *H01M 4/667* (2013.01);
(Continued)

(58) Field of Classification Search
CPC ...... H01M 4/622; H01M 4/525; H01M 4/663; H01M 4/667; H01M 4/661; H01M 4/131;
(Continued)

(56) References Cited

U.S. PATENT DOCUMENTS

2018/0226681 A1 8/2018 Hasegawa et al.
2021/0005889 A1 * 1/2021 Teran ...................... C03C 3/321

FOREIGN PATENT DOCUMENTS

JP 2010-262764 11/2010
JP 2018-125260 8/2018
(Continued)

OTHER PUBLICATIONS

International Search Report of PCT application No. PCT/JP2022/017374 dated Jun. 21, 2022.
(Continued)

*Primary Examiner* — Kiran Quraishi Akhtar
(74) *Attorney, Agent, or Firm* — WHDA, LLP

(57) ABSTRACT

An electrode includes an active material layer that includes an active material, a solid electrolyte, and a binder and a current collector that includes a substrate and a coating layer coating the substrate and being in contact with the active material layer. The binder includes a block copolymer that includes two first blocks constituted of a repeating unit having an aromatic ring and a second block located between the two first blocks. The weight average molecular weight of the block copolymer is 170,000 or more. The coating layer includes conductive carbon.

10 Claims, 1 Drawing Sheet

(51) Int. Cl.
*H01M 4/525* (2010.01)
*H01M 4/66* (2006.01)
*H01M 10/052* (2010.01)

(52) U.S. Cl.
CPC .... *H01M 10/052* (2013.01); *H01M 2004/028* (2013.01)

(58) Field of Classification Search
CPC ............... H01M 4/505; H01M 10/052; H01M 10/0525; H01M 2004/028; Y02E 60/10
See application file for complete search history.

(56) References Cited

FOREIGN PATENT DOCUMENTS

| | | |
|---|---|---|
| JP | 2019-524977 A | 9/2019 |
| WO | 2013/108516 | 7/2013 |
| WO | 2018/023079 A1 | 2/2018 |

OTHER PUBLICATIONS

The EPC Office Action dated May 15, 2025 for the related European Patent Application No. 22811050.8.

* cited by examiner

ELECTRODE AND BATTERY

BACKGROUND

1. Technical Field

The present disclosure relates to an electrode and a battery.

2. Description of the Related Art

Japanese Unexamined Patent Application Publication Nos. 2018-125260 and 2010-262764 and International Publication No. WO 2013/108516 each disclose an electrode including an active material layer containing an active material, a solid electrolyte, and a binder and including a current collector, and a battery using the electrode. In particular, International Publication No. WO 2013/108516 discloses that a conductive carbon film is disposed on a surface of the current collector.

SUMMARY

One non-limiting and exemplary embodiment provides an electrode that is suitable for improving the peel strength between an active material layer and a current collector.

In one general aspect, the techniques disclosed here feature an electrode including an active material layer that contains an active material, a solid electrolyte, and a binder and a current collector that includes a substrate and a coating layer coating the substrate and being in contact with the active material layer. The binder includes a block copolymer that includes two first blocks constituted of a repeating unit having an aromatic ring and a second block located between the two first blocks. The block copolymer has a weight average molecular weight of 170,000 or more, and the coating layer contains conductive carbon.

The present disclosure provides an electrode that is suitable for improving the peel strength between the active material layer and the current collector.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
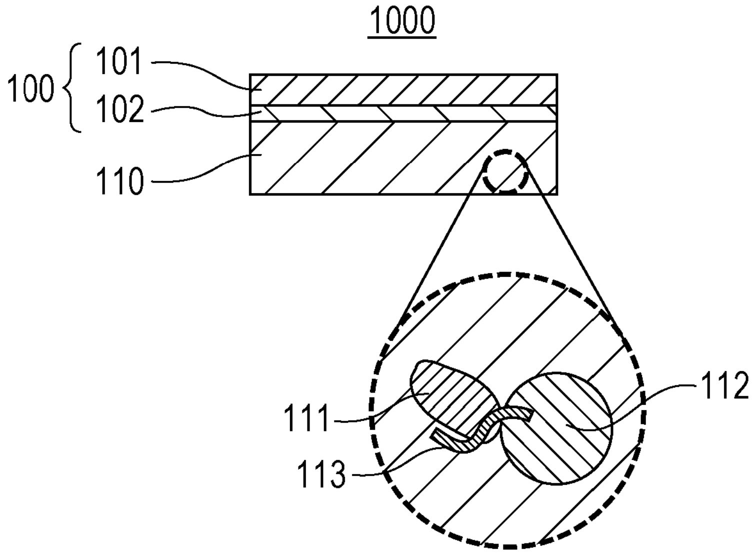
FIG. 1 shows a cross-sectional view of an electrode according to Embodiment 1.

Summary of Aspects of the Present Disclosure

An electrode according to an 1st aspect of the present disclosure includes an active material layer that contains an active material, a solid electrolyte, and a binder and includes a current collector that includes a substrate and a coating layer coating the substrate and being in contact with the active material layer. The binder includes a block copolymer that includes two first blocks constituted of a repeating unit having an aromatic ring and a second block located between the two first blocks. The block copolymer has a weight average molecular weight of 170,000 or more, and the coating layer contains conductive carbon.

According to the 1st aspect, the active material layer and the coating layer of the current collector are in contact with each other. Thereby, the aromatic ring included in the block copolymer of the binder in the active material layer and the conductive carbon in the coating layer interact with each other. This interaction improves the adhesion between the active material layer and the current collector, and there is a tendency of improving the peel strength between the active material layer and the current collector. Thus, the electrode is suitable for improving the peel strength between an active material layer and a current collector.

In a 2nd aspect of the present disclosure, for example, in the electrode according to the 1st aspect, the first block may have an average degree of polymerization of 210 or more.

According to the 2nd aspect, the peel strength between the active material layer and the current collector can be more improved.

In a 3rd aspect of the present disclosure, for example, in the electrode according to the 1st or 2nd aspect, the second block may include a repeating unit derived from a conjugated diene.

According to the 3rd aspect, the peel strength between the active material layer and the current collector can be more improved.

In a 4th aspect of the present disclosure, for example, in the electrode according to any one of the 1st to 3rd aspects, the block copolymer may be a triblock copolymer, and the repeating unit having the aromatic ring may include a repeating unit derived from styrene.

According to the 4th aspect, the block copolymer tends to be flexible and have high strength. Accordingly, the peel strength between the active material layer and the current collector can be more improved.

In a 5th aspect of the present disclosure, for example, in the electrode according to the 4th aspect, the block copolymer may be a hydrogenated product.

In a 6th aspect of the present disclosure, for example, in the electrode according to any one of the 1st to 5th aspects, the block copolymer may include at least one selected from the group consisting of a styrene-ethylene/butylene-styrene block copolymer (SEBS), a styrene-ethylene/propylene-styrene block copolymer (SEPS), and a styrene-ethylene/ethylene/propylene-styrene block copolymer (SEEPS).

According to the 5th or 6th aspect, the block copolymer tends to be more flexible and have higher strength. Accordingly, the peel strength between the active material layer and the current collector can be more improved.

In a 7th aspect of the present disclosure, for example, in the electrode according to any one of the 1st to 6th aspects, the substrate may contain aluminum or an aluminum alloy.

According to a 7th aspect, aluminum and the aluminum alloy are lightweight metals having high electrical conductivity. Accordingly, in this electrode, not only the peel strength between the active material layer and the current collector is improved, but also the weight energy density of a battery can be improved.

In an 8th aspect of the present disclosure, for example, in the electrode according to any one of the 1st to 7th aspects, the active material may include a lithium-containing transition metal oxide.

According to the 8th aspect, not only the peel strength between the active material layer and the current collector is improved, but also the average discharge voltage of the battery can be improved while suppressing the manufacturing costs of the electrode and the battery.

In a 9th aspect of the present disclosure, for example, in the electrode according to the 8th aspect, the active material may contain lithium nickel cobalt manganese oxide.

According to the 9th aspect, not only the peel strength between the active material layer and the current collector is improved, but also the energy density of the battery can be improved.

A battery according to a 10th aspect of the present disclosure includes a positive electrode, a negative electrode, and an electrolyte layer located between the positive electrode and the negative electrode. At least one selected from the group consisting of the positive electrode and the negative electrode is the electrode according to any one of the 1st to 9th aspects.

According to the 10th aspect, in the electrode provided to the battery, not only the peel strength between the active material layer and the current collector is improved, but also the battery can achieve an excellent output property.

In an 11th aspect of the present disclosure, for example, in the battery according to the 10th aspect, the positive electrode may be the electrode above.

According to the 11th aspect, in the electrode of the battery, not only the peel strength between the active material layer and the current collector is improved, but also the battery can achieve a more excellent output property.

Embodiments of the present disclosure will now be described with reference to the drawings.

Embodiment 1

FIG. 1 shows a cross-sectional view of an electrode 1000 according to Embodiment 1. The electrode 1000 in Embodiment 1 includes a current collector 100 and an active material layer 110. The active material layer 110 contains a solid electrolyte 111, an active material 112, and a binder 113. The current collector 100 includes a substrate 101 and a coating layer 102. The coating layer 102 coats the substrate 101 and is in contact with the active material layer 110. The binder 113 includes a block copolymer. The block copolymer included in the binder 113 includes two first blocks constituted of a repeating unit having an aromatic ring and a second block located between the two first blocks. This block copolymer has a weight average molecular weight of 170,000 or more. The coating layer 102 contains conductive carbon.

Due to the configuration above, in the electrode 1000 according to Embodiment 1, peeling between the active material layer 110 and the current collector 100 tends to be suppressed. Furthermore, it is possible to improve the output property of the battery including the electrode 1000. The electrode 1000 can be used as, for example, an electrode of an all-solid-state secondary battery.

Japanese Unexamined Patent Application Publication Nos. 2018-125260 and 2010-262764 each disclose an electrode including an active material layer that contains an active material, a solid electrolyte, and a binder and including a current collector, and a battery using the electrode. However, in the configurations of the electrodes disclosed in Japanese Unexamined Patent Application Publication Nos. 2018-125260 and 2010-262764, the peeling strength between the active material layer and the current collector cannot be sufficiently improved.

International Publication No. WO 2013/108516 discloses an electrode including an active material layer that contains an active material, a solid electrolyte, and a binder and including a current collector, and a battery using the electrode. In particular, International Publication No. WO 2013/108516 discloses that a conductive carbon film is disposed on a surface of the current collector. However, in the configuration of the electrode disclosed in International Publication No. WO 2013/108516, the peel strength between the active material layer and the current collector cannot be sufficiently improved.

The present inventors newly focused on the fact that in existing electrodes, the adhesion between the active material layer and the current collector is not sufficient and studied active material layers and current collectors. As a result, the present inventors newly found that when an active material layer that contains a block polymer having a large molecular weight and having an aromatic ring and a current collector that includes conductive carbon are stacked, the peel strength between the active material layer and the current collector is improved. The detailed mechanism of this is not clear at this stage, but it is inferred that there is an influence due to the interaction between the aromatic ring included in the block copolymer and conductive carbon. Such interaction is, for example, $\pi$-$\pi$ interaction. Furthermore, it is inferred that pseudo-crosslinking of a plurality of block copolymers due to interaction of the blocks constituted of a repeating unit having an aromatic ring also influences the peel strength between the active material layer and the current collector.

The present inventors proceeded with further studies based on the above findings. As a result, it was newly found that when an active material layer 110 containing a block polymer that includes two first blocks constituted of a repeating unit having an aromatic ring and a second block located between the two first blocks and has a weight average molecular weight of 170,000 or more and a current collector 100 that includes a coating layer 102 containing conductive carbon are stacked, the peel strength between the active material layer 110 and the current collector 100 in an electrode 1000 can be improved. As described above, in the electrode 1000 in Embodiment 1, the active material layer 110 containing a binder 113 that includes the block copolymer and the coating layer 102 containing conductive carbon are in contact with each other. Consequently, in the electrode 1000 in Embodiment 1, the adhesion between the active material layer 110 and the current collector 100 can be improved by interaction between the aromatic ring of the block copolymer included in the binder 113 and conductive carbon. Due to the improvement in the adhesion between the active material layer 110 and the current collector 100, the peel strength between the active material layer 110 and the current collector 100 tends to be improved.

As described above, the electrode 1000 in Embodiment 1 includes the active material layer 110 and the current collector 100. Hereinafter, the active material layer 110 and the current collector 100 will be described in detail.

Active Material Layer

The active material layer 110 in Embodiment 1 includes a solid electrolyte 111, an active material 112, and a binder 113. Hereinafter, the solid electrolyte 111, the active material 112, and the binder 113 will be described in detail below.

Binder

As described above, the binder 113 includes a block copolymer that includes two first blocks constituted of a repeating unit having an aromatic ring and a second block located between the two first blocks. In the first block, the repeating units having an aromatic ring are serially arranged. The repeating unit means a molecular structure derived from a monomer and may also be called a constituent unit. The block copolymer has, for example, an arrangement of a triblock constituted of two first blocks and one second block.

The block copolymer is, for example, an ABA-type triblock copolymer. In this triblock copolymer, the A block corresponds to the first block, and the B block corresponds to the second block. The first block functions as, for example, a hard segment. The second block functions as, for example, a soft segment.

In the present disclosure, the aromatic ring means a ring structure having aromaticity. Examples of the aromatic ring included in the first block include benzene aromatic rings such as a benzene ring and a naphthalene ring; non-benzene aromatic rings such as a tropylium ring; and heteroaromatic rings such as a pyridine ring and a pyrrole ring.

Examples of the polymer constituting the first block include polystyrene, polyphenyl methacrylate, polybenzyl methacrylate, polyphenylene, polyaryletherketone, polyarylethersulfone, and polyphenylene oxide. In the first block, the repeating unit having an aromatic ring includes, for example, a repeating unit derived from styrene. In the present disclosure, a triblock copolymer including a repeating unit of which the first block is derived from styrene may be called a styrene-based triblock copolymer.

The compositions of the two first blocks included in the block copolymer may be the same as or different from each other. Furthermore, the degrees of polymerization of the two first blocks may be the same as or different from each other.

The second block includes, for example, a repeating unit derived from a conjugated diene. Examples of the conjugated diene include butadiene and isoprene. The repeating unit derived from the conjugated diene may be hydrogenated. That is, the repeating unit derived from a conjugated diene may or may not have an unsaturated bond such as a carbon-carbon double bond. The second block is constituted of, for example, a repeating unit derived from a conjugated diene.

The block copolymer included in the binder 113 may be a styrene-based triblock copolymer. Examples of the styrene-based triblock copolymer include a styrene-ethylene/butylene-styrene block copolymer (SEBS), a styrene-ethylene/propylene-styrene block copolymer (SEPS), a styrene-ethylene/ethylene/propylene-styrene block copolymer (SEEPS), a styrene-butadiene-styrene block copolymer (SBS), and a styrene-isoprene-styrene block copolymer (SIS). These styrene-based triblock copolymers may be called a styrene-based thermoplastic elastomer. These styrene-based triblock copolymers tend to be flexible and have high strength. Accordingly, when the binder 113 includes the styrene-based triblock copolymer, in the electrode 1000, the peel strength between the active material layer 110 and the current collector 100 tends to be more improved.

The block copolymer included in the binder 113 may be a hydrogenated product. The hydrogenated product means a copolymer in which an unsaturated bond, such as a carbon-carbon double bond, included in the block copolymer is hydrogenated. In particular, in the second block of the block copolymer, the repeating unit derived from a conjugated diene may be hydrogenated. In the present disclosure, a copolymer obtained by hydrogenation of a styrene-based triblock copolymer having an unsaturated bond, such as a carbon-carbon double bond, may be called a hydrogenated styrene-based triblock copolymer. The hydrogenation rate of the block copolymer may be 90% or more, 95% or more, or 99% or more. The hydrogenation rate of a block copolymer means the ratio of the number of bonds changed from a carbon-carbon double bond to a single bond by hydrogenation to the number of carbon-carbon double bonds included in the block copolymer before the hydrogenation. The hydrogenation rate of a block copolymer can be specified by proton nuclear magnetic resonance ($^1$H NMR) measurement.

Examples of the hydrogenated styrene-based triblock copolymer include a styrene-ethylene/butylene-styrene block copolymer (SEBS), a styrene-ethylene/propylene-styrene block copolymer (SEPS), and a styrene-ethylene/ethylene/propylene-styrene block copolymer (SEEPS). That is, the block copolymer included in the binder 113 may include at least one selected from the group consisting of SEBS, SEPS, and SEEPS. The hydrogenated styrene-based triblock copolymer tends to be more flexible and have higher strength. Accordingly, when the binder 113 includes a hydrogenated styrene-based triblock copolymer, in the electrode 1000, the peel strength between the active material layer 110 and the current collector 100 tends to be more improved.

The block copolymer included in the binder 113 may include a modifying group. The modifying group means a functional group that is chemically modifying all repeating units included in the polymer chain, some repeating units included in the polymer chain, or the terminal part of the polymer chain. The modifying group can be introduced into the polymer chain by a substitution reaction, an addition reaction, or the like. The modifying group includes, for example, an element having relatively high electronegativity, such as O and N, or having relatively low electronegativity, such as Si. According to the modifying group including such an element, it is possible to add polarity to the block copolymer. Examples of the modifying group include a carboxylic acid group, an acid anhydride group, an acyl group, a hydroxy group, a sulfo group, a sulfanyl group, a phosphoric acid group, a phosphonic acid group, an isocyanate group, an epoxy group, a silyl group, an amino group, a nitrile group, and a nitro group. A specific example of the acid anhydride group is a maleic anhydride group. When the block copolymer includes a modifying group, interaction may occur between the binder 113 and the metal included in the current collector 100. According to this interaction, in the electrode 1000, the peel strength between the active material layer 110 and the current collector 100 tends to be more improved.

The block copolymer included in the binder 113 may include a modifying group as a nitrogen component. The modifying group including a nitrogen component is a nitrogen-containing functional group, and examples thereof include an amino group such as an amine compound. The position of the modifying group may be a polymer chain terminal. The block copolymer included in the binder 113 may be, for example, an amine-terminated hydrogenated styrene-based triblock copolymer.

In the binder 113, the block copolymer has a weight average molecular weight (Mw) of 170,000 or more. The weight average molecular weight of the block copolymer may be 200,000 or more, 230,000 or more, 300,000 or more, or 400,000 or more. The upper limit of the weight average molecular weight of the block copolymer is not particularly limited and is, for example, 1,000,000. The weight average molecular weight can be specified by gel permeation chromatography (GPC) measurement using polystyrene as a standard sample. In other words, the weight average molecular weight is a value converted by polystyrene. In the GPC measurement, chloroform may be used as an eluent. When two or more peak tops are observed in a GPC chart, a weight average molecular weight calculated from the whole peak range including each peak top can be recognized as the weight average molecular weight of the block copolymer.

In the binder 113, the degree of dispersion of the block copolymer may be 1.6 or less, 1.5 or less, 1.4 or less, or 1.3 or less. The lower limit of the degree of dispersion of the block copolymer is not particularly limited and may be, for example, 1.1. The degree of dispersion of the block copolymer means a ratio the weight average molecular weight ($M_w$) to the number average molecular weight ($M_n$), $Mw/M_n$. The number average molecular weight of the block copolymer can be specified by GPC measurement described above regarding the weight average molecular weight. When the block copolymer has a degree of dispersion of 1.6 or less and a narrow molecular weight distribution, more uniform interaction occurs between polymer chains of a plurality of block copolymers. Consequently, in the electrode 1000, the peel strength between the active material layer 110 and the current collector 100 tends to be more improved.

In the block copolymer of the binder 113, the average degree of polymerization of the first block may be 210 or more, 230 or more, 250 or more, 270 or more, 280 or more, 300 or more, 350 or more, 400 or more, or 460 or more. The upper limit of the average degree of polymerization of the first block is not particularly limited and is, for example, 1000. In a configuration in which the average degree of polymerization of the first block is 210 or more, in the electrode 1000 in Embodiment 1, the adhesive strength between the active material layer 110 and the current collector 100 tends to be more improved.

In the block copolymer of the binder 113, the average degree of polymerization of the first block is the average value of the degrees of polymerization per one first block. For example, when the block copolymer is an ABA-type triblock copolymer, the average degree of polymerization of the first block corresponds to the average value of the number of the repeating units in the two A blocks included in one polymer chain constituting the triblock copolymer. When the block copolymer is an ABA-type triblock copolymer, the average degree of polymerization of the first block can be calculated, based on the number average molecular weight ($M_n$) of the block copolymer, the molar fraction (φ) of the repeating unit having the aromatic ring in the block copolymer, the molecular weight ($M_1$) of the repeating unit having an aromatic ring, and the molecular weight ($M_2$) of the repeating unit constituting the second block, by the following Expression (i):

[Math 1]

$$\text{Average degree of polymerization of first block} = \frac{M_n \times \varphi}{M_1 \times \varphi + M_2 \times (1-\varphi)} \times \frac{1}{2} \quad \text{(i)}$$

In the block copolymer, when the ratio of the degree of polymerization of the repeating unit having an aromatic ring and the degree of polymerization of the repeating unit constituting the second block is m:n, the molar fraction (φ) of the repeating unit having an aromatic ring in the block copolymer can be calculated by φ=m/(m+n). The molar fraction (φ) of the repeating unit having an aromatic ring in the block copolymer can be determined by, for example, proton nuclear magnetic resonance ($^1$H NMR) measurement.

The binder 113 may include a binder other than the block copolymer, such as a binding agent that can be generally used as a binder for a battery. Alternatively, the binder 113 may be the block copolymer. In other words, the binder 113 may include the block copolymer only.

Examples of the binding agent include polyvinylidene fluoride (PVDF), polytetrafluoroethylene (PTFE), polyethylene, polypropylene, aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester (PMMA), polymethacrylic acid ethyl ester, polymethacrylic acid hexyl ester, polyvinyl acetate, polyvinylpyrrolidone, polyether, polycarbonate, polyethersulfone, polyetherketone, polyetheretherketone, polyphenylene sulfide, hexafluoropolypropylene, styrene-butadiene rubber, carboxymethylcellulose, and ethylcellulose. As the binding agent, a copolymer synthesized using two or more monomers selected from the group consisting of tetrafluoroethylene, hexafluoroethylene, hexafluoropropylene, perfluoroalkyl vinyl ethe, fluorinated vinylidene, chlorotrifluoroethylene, ethylene, propylene, butadiene, isoprene, styrene, pentafluoropropylene, fluoromethyl vinyl ether, acrylic ester, acrylic acid, and hexadiene can also be used. These binding agents may be used alone or in combination of two or more thereof.

The binding agent may include an elastomer from the viewpoint of excellent binding properties. The elastomer means a polymer having rubber elasticity. The elastomer that is used as the binder 113 may be a thermoplastic elastomer or may be a thermosetting elastomer. Examples of the elastomer include, in addition to the above-mentioned styrene-based elastomers, butadiene rubber (BR), isoprene rubber (IR), chloroprene rubber (CR), acrylonitrile-butadiene rubber (NBR), hydrogenated isoprene rubber (HIR), hydrogenated butyl rubber (HIIR), hydrogenated nitrile rubber (HNBR), and acrylate butadiene rubber (ABR). A mixture including two or more selected from these elastomers may be used.

Active Material

In Embodiment 1, the active material 112 is a positive electrode active material or a negative electrode active material. When the active material 112 is a positive electrode active material, the electrode 1000 can be used as a positive electrode. When the active material 112 is a negative electrode active material, the electrode 1000 can be used as a negative electrode.

The positive electrode active material as the active material 112 is, for example, a material that has a property of occluding and releasing metal ions (for example, lithium ions). Examples of the positive electrode active material include a lithium-containing transition metal oxide, a transition metal fluoride, a polyanionic material, a fluorinated polyanionic material, a transition metal sulfide, a transition metal oxysulfide, and a transition metal oxynitride. Examples of the lithium-containing transition metal oxide include $Li(Ni,Co,Al)O_2$, $Li(Ni,Co,M_n)O_2$, and $LiCoO_2$. The active material 112 includes, for example, a lithium-containing transition metal oxide. When a lithium-containing transition metal oxide is used as the active material 112, the manufacturing cost of the electrode 1000 and a battery can be reduced, and the average discharge voltage of the battery can be improved.

The active material 112 may include lithium nickel cobalt manganese oxide. This active material 112 is suitable for improving the energy density of a battery. For example, the positive electrode active material as the active material 112 may be $Li(Ni,Co,M_n)O_2$.

The negative electrode active material as the active material 112 is, for example, a material that has a property of occluding and releasing metal ions (for example, lithium ions). Examples of the negative electrode active material are a metal material, a carbon material, an oxide, a nitride, a tin compound, and a silicon compound. The metal material may be a single metal or an alloy. Examples of the metal material are a lithium metal and a lithium alloy. Examples of the carbon material are natural graphite, coke, graphitizing carbon, carbon fibers, spherical carbon, artificial graphite, and amorphous carbon. The capacity density of a batter can be improved by using silicon (Si), tin (Sn), a silicon compound, a tin compound, or the like as the active material 112. The safety of a battery can be improved by using an oxide compound including titanium (Ti) or niobium (Nb) as the active material 112.

Solid Electrolyte

In Embodiment 1, as the solid electrolyte 111, a sulfide solid electrolyte, an oxide solid electrolyte, a halide solid electrolyte, a polymer solid electrolyte, a complex hydride solid electrolyte, or the like can be used. The solid electrolyte 111 may include a halide solid electrolyte.

In the present disclosure, the term "oxide solid electrolyte" means a solid electrolyte containing oxygen. The oxide solid electrolyte may further include an anion other than sulfur and halogen elements, as an anion other than oxygen.

In the present disclosure, the term "halide solid electrolyte" means a solid electrolyte containing a halogen element and not containing sulfur. In the present disclosure, the solid electrolyte not containing sulfur means a solid electrolyte represented by a formula not containing a sulfur element. Accordingly, a solid electrolyte containing a very small amount of sulfur, for example, 0.1 mass % or less of sulfur, is encompassed in a solid electrolyte not containing sulfur. The halide solid electrolyte may further contain oxygen as an anion other than halogen elements.

As the sulfide solid electrolyte, for example, $Li_2S—P_2S_5$, $Li_2S—SiS_2$, $Li_2S—B_2S_3$, $Li_2S—GeS_2$, $Li_{3.25}Ge_{0.25}P_{0.75}S_4$, or $Li_{10}GeP_2S_{12}$ can be used. To these sulfide solid electrolytes, LiX, $Li_2O$, $MO_q$, $Li_pMO_q$, or the like may be added. Element X in "LiX" is at least one selected from the group consisting of F, Cl, Br, and I. Element M in "$MO_q$" and "$Li_pMO_q$" is at least one selected from the group consisting of P, Si, Ge, B, Al, Ga, In, Fe, and Zn. The p and q in "$MO_q$" and "$Li_pMO_q$" are each independently a natural number.

As the sulfide solid electrolyte, for example, $Li_2S—P_2S_5$ glass ceramics may be used. To the $Li_2S—P_2S_5$ glass ceramics, LiX, $Li_2O$, $MO_q$, $Li_pMO_q$, or the like may be added, and two or more selected from LiCl, LiBr, and LiI may be added. Since $Li_2S—P_2S_5$ glass ceramics are relatively soft materials, a solid electrolyte sheet containing $Li_2S—P_2S_5$ glass ceramics can manufacture a battery with higher durability.

As the oxide solid electrolyte, for example, an NASICON-type solid electrolyte represented by $LiTi_2(PO_4)_3$ or its element substitute, a $(LaLi)TiO_3$-based perovskite-type solid electrolyte, an LISICON-type solid electrolyte represented by $Li_{14}ZnGe_4O_{16}$, $Li_4SiO_4$, $LiGeO_4$, or its element substitute, a garnet-type solid electrolyte represented by $Li_7La_3Zr_2O_{12}$ or its element substitute, $Li_3PO_4$ or its N-substitute, or glass or glass ceramics based on an Li—B—O compound such as $LiBO_2$ or $Li_3BO_3$ and doped with $Li_2SO_4$, $Li_2CO_3$, or the like can be used.

The halide solid electrolyte includes, for example, Li, M1, and X. $M_1$ is at least one selected from the group consisting of metal elements and metalloid elements excluding Li. X is at least one selected from the group consisting of F, Cl, Br, and I. The halide solid electrolyte has high thermal stability and can therefore improve the safety of the battery. Furthermore, the halide solid electrolyte does not contain sulfur and therefore can suppress the generation of hydrogen sulfide gas. In contrast, the halide solid electrolytes are hard and brittle materials compared to sulfide solid electrolytes. According to the electrode 1000 of Embodiment 1, even if a halide solid electrolyte is used, the peel strength between the active material layer 110 and the current collector 100 can be more effectively improved.

In the present disclosure, the "metalloid elements" are B, Si, Ge, As, Sb, and Te.

In the present disclosure, the "metal elements" are all elements excluding hydrogen in Groups 1 to 12 of the Periodic Table and all elements excluding B, Si, Ge, As, Sb, Te, C, N, P, O, S, and Se in Groups 13 to 16 of the Periodic Table.

That is, in the present disclosure, the "metalloid elements" and "metal elements" are element groups that can become cations when they form inorganic compounds with halogen elements.

For example, the halide solid electrolyte may be a material represented by the following Formula (1):

$$Li_\alpha M1_\beta X_\gamma. \quad \text{Formula (1)}$$

In Formula (1), α, β, and γ are each independently a value higher than 0, and γ can be, for example, 4 or 6.

According to the above configuration, the ion conductivity of the halide solid electrolyte is improved, and thereby the ion conductivity of the electrode 1000 in Embodiment 1 can be improved. Accordingly, when the electrode 1000 in Embodiment 1 is used in a battery, the cycle characteristics of the battery can be more improved.

In Formula (1), element $M_1$ may include Y (yttrium). That is, the halide solid electrolyte may include Y as a metal element.

The halide solid electrolyte including Y may be represented by, for example, the following Formula (2):

$$Li_aMe_bY_cX_6. \quad \text{Formula (2)}$$

In Formula (2), a, b, and c may satisfy a+mb+3c=6 and c>0. Element Me is at least one selected from the group consisting of metal elements and metalloid elements excluding Li and Y, and m represents the valence of element Me. When element Me includes multiple types of elements, mb is the total value of the products of the composition ratio of each element and the valence of the element. For example, when Me includes element Me1 and element Me2, the composition ratio of element Me1 is $b_1$, the valence of element Me1 is $m_1$, the composition ratio of element Me2 is $b_2$, and the valence of element Me2 is $m_2$, mb is represented by $m_1b_1+m_2b_2$. In Formula (2), element X is at least one selected from the group consisting of F, Cl, Br, and I.

Element Me may be, for example, at least one selected from the group consisting of Mg, Ca, Sr, Ba, Zn, Sc, Al, Ga, Bi, Zr, Hf, Ti, Sn, Ta, Gd, and Nb.

As the halide solid electrolyte, for example, the following materials can be used.

According to the following materials, the ion conductivity of the solid electrolyte 111 is more improved, and thereby the ion conductivity of the electrode 1000 in Embodiment 1 is more improved. Consequently, the electrode 1000 in Embodiment 1 can more improve the cycle characteristics of the battery.

The halide solid electrolyte may also be a material represented by the following Formula (A1):

$$Li_{6-3d}Y_dX_6. \quad \text{Formula (A1)}$$

In Formula (A1), element X is at least one selected from the group consisting of Cl, Br, and I. In Formula (A1), d satisfies 0<d<2.

The halide solid electrolyte may also be a material represented by the following Formula (A2):

$$Li_3YX_6. \quad \text{Formula (A2)}$$

In Formula (A2), element X is at least one selected from the group consisting of Cl, Br, and I.

The halide solid electrolyte may also be a material represented by the following Formula (A3):

$$Li_{3-3\delta}Y_{1+\delta}Cl_6. \quad \text{Formula (A3)}$$

In Formula (A3), 6 satisfies 0<δ≤0.15.

The halide solid electrolyte may also be a material represented by the following Formula (A4):

$$Li_{3-3\delta}Y_{1+\delta}Br_6. \quad \text{Formula (A4)}$$

In Formula (A4), 6 satisfies 0<δ≤0.25.

The halide solid electrolyte may also be a material represented by the following Formula (A5):

$$Li_{3-3\delta+a}Y_{1+\delta-a}Me_aCl_{6-x-y}Br_xI_y. \quad \text{Formula (A5)}$$

In Formula (A5), element Me is at least one selected from the group consisting of Mg, Ca, Sr, Ba, and Zn.

Furthermore, in Formula (A5), the followings are satisfied:

$$-1<\delta<2;$$

$$0<a<3;$$

$$0<(3-3\delta+a);$$

$$0<(1+\delta-a);$$

$$0\leq x\leq 6;$$

$$0\leq y\leq 6; \text{ and}$$

$$(x+y)\leq 6.$$

The halide solid electrolyte may also be a material represented by the following Formula (A6):

$$Li_{3-3\delta}Y_{1+\delta-a}Me_aCl_{6-x-y}Br_xI_y. \quad \text{Formula (A6)}$$

In Formula (A6), element Me is at least one selected from the group consisting of Al, Sc, Ga, and Bi.

Furthermore, in Formula (A6), the followings are satisfied:

$$-1<\delta<1;$$

$$0<a<2;$$

$$0<(1+\delta-a);$$

$$0\leq x\leq 6;$$

$$0\leq y\leq 6; \text{ and}$$

$$(x+y)\leq 6.$$

The halide solid electrolyte may also be a material represented by the following Formula (A7):

$$Li_{3-3\delta-a}Y_{1+\delta-a}Me_aCl_{6-x-y}Br_xI_y. \quad \text{Formula (A7)}$$

In Formula (A7), element Me is at least one selected from the group consisting of Zr, Hf, and Ti.

Furthermore, in Formula (A7), the followings are satisfied:

$$-1<\delta<1;$$

$$0<a<1.5;$$

$$0<(3-3\delta-a);$$

$$0<(1+\delta-a);$$

$$0\leq x\leq 6;$$

$$0\leq y\leq 6; \text{ and}$$

$$(x+y)\leq 6.$$

The halide solid electrolyte may also be a material represented by the following Formula (A8):

$$Li_{3-3\delta-2a}Y_{1+\delta-a}Me_aCl_{6-x-y}Br_xI_y. \quad \text{Formula (A8)}$$

In Formula (A8), element Me is at least one selected from the group consisting of Ta and Nb.

Furthermore, in Formula (A8), the followings are satisfied:

$$-1<\delta<1;$$

$$0<a<1.2;$$

$$0<(3-3\delta-2a);$$

$$0<(1+\delta-a);$$

$$0\leq x\leq 6;$$

$$0\leq y\leq 6; \text{ and}$$

-continued $$x + y \leq 6.$$

The halide solid electrolyte may be a compound including Li, M2, O (oxygen), and X2. Element M2 includes, for example, at least one selected from the group consisting of Nb and Ta. X2 is at least one selected from the group consisting of F, Cl, Br, and I.

The compound including Li, M2, X2, and O (oxygen) may be represented by, for example, a formula: $Li_xM2O_yX2_{5+x-2y}$. Here, x may satisfy 0.1<x<7.0, and γ may satisfy 0.4<y<1.9.

As the halide solid electrolyte, more specifically, for example, $Li_3Y(Cl,Br,I)_6$, $Li_{2.7}Y_{1.1}(Cl,Br,I)_6$, $Li_2Mg(F,Cl,Br,I)_4$, $Li_2Fe(F,Cl,Br,I)_4$, $Li(Al,Ga,In)(F,Cl,Br,I)_4$, $Li_3(Al,Ga,In)(F,Cl,Br,I)_6$, $Li_3(Ca,Y,Gd)(Cl,Br,I)_6$, $Li_{2.7}(Ti,Al)F_6$, $Li_{2.5}(Ti,Al)F_6$, and $Li(Ta,Nb)O(F,Cl)_4$ can be used. In the present disclosure, when the elements in a formula are denoted as "(Al,Ga,In)", this notation indicates at least one element selected from the parenthesized group of elements. That is, "(Al,Ga,In)" is synonymous with "at least one selected from the group consisting of Al, Ga, and In". The same is applied to other elements.

As the polymer solid electrolyte, for example, a compound of a polymer compound and a lithium salt can be used. The polymer compound may have an ethylene oxide structure. A polymer compound having an ethylene oxide structure can contain a large amount of a lithium salt. Accordingly, it is possible to more improve the ion conductivity. As the lithium salt, for example, $LiPF_6$, $LiBF_4$, $LiSbF_6$, $LiAsF_6$, $LiSO_3CF_3$, $LiN(SO_2F)_2$, $LiN(SO_2CF_3)_2$, $LiN(SO_2C_2F_5)_2$, $LiN(SO_2CF_3)(SO_2C_4F_9)$, and $LiC(SO_2CF_3)_3$ can be used. The lithium salts may be used alone or in combination of two or more thereof.

As the complex hydride solid electrolyte, for example, $LiBH_4$—LiI and $LiBH_4$—$P_2S_5$ can be used.

Active Material Layer

The active material layer 110 contains the solid electrolyte 111 as described above. According to this configuration, the ion conductivity inside the active material layer 110 is improved, and the battery can operate at high output.

When the shape of the solid electrolyte 111 contained in the active material layer 110 is particulate (e.g., spherical), the median diameter of the solid electrolyte 111 may be 100 μm or less. When the median diameter of the solid electrolyte 111 is 100 μm or less, the active material 112 and the solid electrolyte 111 can be well dispersed in the active material layer 110. Consequently, the charge and discharge characteristics of the battery are improved.

The median diameter of the solid electrolyte 111 contained in the active material layer 110 may be smaller than that of the active material 112. Consequently, the solid electrolyte 111 and the active material 112 can be well dispersed.

The median diameter of the active material 112 may be 0.1 μm or more and 100 μm or less. When the median diameter of the active material is 0.1 μm or more, the active material 112 and the solid electrolyte 111 are well dispersed in the active material layer 110. As a result, the charge and discharge characteristics of the battery using the electrode 1000 are improved. When the median diameter of the active material 112 is 100 μm or less, the lithium diffusion speed in the active material is improved. Consequently, the battery using the electrode 1000 can operate at high output.

The median diameter means the particle diameter at which the accumulated volume in a volume-based particle size distribution is equal to 50%. The volume-based particle size distribution is determined by a laser diffraction scattering method. The same is applied to other materials below.

In the active material layer 110, the volume ratio of the active material 112 and the solid electrolyte 111, "v1:(100−v1)", may satisfy 30≤v1≤95, where v1 indicates the volume ratio of the active material 112 when the total volume of the active material 112 and the solid electrolyte 111 contained in the active material layer 110 is defined as 100. When 30≤v1 is satisfied, the battery easily secures a sufficient energy density. When v1≤95 is satisfied, the battery can more easily operate at high output.

The active material layer 110 may have a thickness of 10 μm or more and 500 m or less. When the thickness of the active material layer 110 is 10 μm or more, the battery can easily secure a sufficient energy density. When the thickness of the active material layer 110 is 500 μm or less, the battery can more easily operate at high output.

The active material 112 may be coated by a coating material for reducing the interface resistance with the solid electrolyte 111. As the coating material, a material having low electron conductivity can be used. As the coating material, an oxide material, an oxide solid electrolyte, or the like can be used.

As the oxide material that can be used as the coating material, $SiO_2$, $Al_2O_3$, $TiO_2$, $B_2O_3$, $Nb_2O_5$, $WO_3$, $ZrO_2$, or the like can be used.

As the oxide solid electrolyte that can be used as the coating material, for example, Li—Nb—O compounds such as $LiNbO_3$, Li—B—O compounds such as $LiBO_2$ and $Li_3BO_3$, Li—Al—O compounds such as $LiAlO_2$, Li—Si—O compounds such as $Li_4SiO_4$, Li—S—O compounds such as $Li_2SO_4$, Li—Ti—O compounds such as $Li_4Ti_5O_{12}$, Li—Zr—O compounds such as $Li_2ZrO_3$, Li—Mo—O compounds such as $Li_2MoO_3$, Li—V—O compounds such as $LiV_2O_5$, and Li—W—O compounds such as $Li_2WO_4$ can be used. The oxide solid electrolyte has high ion conductivity and high high-potential stability. Accordingly, the charge and discharge efficiency of the battery can be more improved by using the oxide solid electrolyte as the coating material.

The coating material that coats the active material 112 may further include a halide solid electrolyte mentioned above together with the oxide solid electrolyte. The active material layer 110 may contain the active material 112 coated with this coating material and a sulfide solid electrolyte as the solid electrolyte 111.

In the active material layer 110, the rate of the binder 113 to the solid electrolyte 111 may be 0.5 mass % or more and 10 mass % or less, 1 mass % or more and 6 mass % or less, or 1 mass % or more and 5 mass % or less. When the rate of the binder 113 to the solid electrolyte 111 is 0.5 mass % or more, a larger number of particles of the solid electrolyte 111 tend to bind with each other by the binder 113. Consequently, the film strength of the active material layer 110 can be improved. When the rate of the binder 113 to the solid electrolyte 111 is 10 mass % or less, in the active material layer 110, the contact between particles of the solid electrolyte 111 tends to be improved. Consequently, the ion conductivity of the active material layer 110 can be improved.

Current Collector

The current collector 100 in Embodiment 1 includes a substrate 101 and a coating layer 102. The coating layer 102 coats the substrate 101 and is in contact with the active material layer 110. The coating layer 102 contains conductive carbon. As described above, in the electrode 1000 in Embodiment 1, such a configuration causes interaction between the aromatic ring of the block copolymer included in the binder 113 in the active material layer 110 and the conductive carbon contained in the coating layer 102 in the current collector 100. This interaction can improve the adhesion between the active material layer 110 and the current collector 100.

Coating Layer

The coating layer 102 in Embodiment 1 may entirely coat the main surface of the substrate 101 or coat a part of the main surface of the substrate 101. The "main surface" means a face having the widest area of the substrate 101. The coating layer 102 is located between the substrate 101 and the active material layer 110 and is in contact with both the substrate 101 and the active material layer 110. The shape of the coating layer 102 may be, for example, dots or stripes.

Examples of the conductive carbon contained in the coating layer 102 include graphite such as natural graphite and artificial graphite, carbon black such as acetylene black (AB) and Ketjen black (KB), and conductive fibers such as vapor grown carbon fiber (VGCF (registered trademark)) and carbon nanotubes (CNT).

The content rate of the conductive carbon in the coating layer 102 is not particularly limited and is, for example, 5 mass % or more and 80 mass % or less, 10 mass % or more and 60 mass % or less, or 15 mass % or more and 45 mass % or less. When the content rate of conductive carbon is 5 mass % or more, the electrical conductivity of the coating layer 102 is improved. Accordingly, the output of the battery can be increased. When the content rate of conductive carbon is 80 mass % or less, the binding agent described later and so on are sufficiently present. Accordingly, the peeling of the coating layer 102 tends to be suppressed.

The coating layer 102 may include an element or a component other than conductive carbon. Such an element or component can be added to the coating layer 102 by contamination or the like. For example, an inevitable oxide film or the like may be formed on a part of the surface of the coating layer 102. That is, the coating layer 102 may contain an inevitable oxide or the like. Furthermore, the coating layer 102 may contain a binding agent. The coating layer 102 containing the binding agent tends to be easily retained on the substrate 101. The binding agent is not particularly limited, and the above-mentioned binding agent may be used. As the binding agent, for example, fluorine-based resin, such as polytetrafluoroethylene (PTFE), a tetrafluoroethylene-perfluoroalkyl vinyl ether copolymer (PFA), or polyvinylidene fluoride (PVDF), may be used. The fluorine-based resin has excellent solvent resistance and therefore can suppress the peeling of the coating layer 102 even when the active material layer 110 is produced by a wet coating method.

The coating layer 102 can be produced by, for example, a method of sputtering a material for the coating layer 102 to a surface of the substrate 101. The coating layer 102 may be produced by applying a solution or dispersion containing the material for the coating layer 102 to a surface of the substrate 101. The coating with the solution or dispersion may be performed using a gravure coater, a die coater, or the like.

When a solution or dispersion containing the material for the coating layer 102 is applied to a surface of the substrate 101, the coating weight of the material for the coating layer 102 is not particularly limited and may be, for example, 0.01 $g/m^2$ or more and 5 $g/m^2$ or less or 0.1 $g/m^2$ or more and 3 $g/m^2$ or less. When the coating weight is 0.01 $g/m^2$ or more, the substrate 101 and the active material layer 110 can be sufficiently prevented from coming into contact with each other. Consequently, corrosion of the substrate 101 can be suppressed. When the coating weight is 5 $g/m^2$ or less, the electric resistance of the coating layer 102 is reduced, and the battery can easily operate at high output.

The thickness of the coating layer 102 is not particularly limited and may be, for example, 0.001 μm or more and 5 m or less or 0.1 m or more and 2 m or less. When the thickness of the coating layer 102 is 0.001 μm or more, the substrate 101 and the active material layer 110 can be sufficiently prevented from coming into contact with each other. Consequently, corrosion of the substrate 101 can be suppressed. When the thickness of the coating layer 102 is 5 μm or less, the electric resistance of the coating layer 102 is reduced, and the battery can easily operate at high output.

Substrate

The substrate 101 has, for example, a tabular shape. As the material for the substrate 101, a metal or an alloy may be used. Examples of the metal include aluminum, iron, nickel, and copper. Examples of the metal alloy include an aluminum alloy and stainless steel (SUS). The substrate 101 may include aluminum or an aluminum alloy.

The substrate 101 may contain aluminum as a main component. The "substrate 101 contains aluminum as a main component" means that the content rate of aluminum in the substrate 101 is 50 mass % or more. Aluminum is a lightweight metal having high electrical conductivity. Accordingly, the electrode 1000 including the substrate 101 containing aluminum as the main component can improve the weight energy density of the battery. The substrate 101 containing aluminum as the main component may further include an element other than aluminum. When the substrate 101 consists of aluminum only, that is, when the content rate of aluminum in the substrate 101 is 100%, the strength of the substrate 101 may decrease. Accordingly, the substrate 101 may contain an element other than aluminum. The content rate of aluminum in the substrate 101 may be 99 mass % or less or 90 mass % or less.

The substrate 101 may contain an aluminum alloy. The aluminum alloy is lightweight and has high strength. Accordingly, an electrode 1000 including the substrate 101 containing an aluminum alloy can achieve a battery with both a high weight energy density and high durability. The aluminum alloy is not particularly limited, and examples thereof include an Al—Cu alloy, an Al-$M_n$ alloy, an Al-$M_n$-Cu alloy, and an Al—Fe—Cu alloy.

As the material for the substrate 101 in Embodiment 1, an Al-$M_n$ alloy may be used. The Al-$M_n$ alloy has high strength and has excellent formability and corrosion resistance. Accordingly, the electrode 1000 including the substrate 101 containing an Al-$M_n$ alloy can improve the cycle characteristics of the battery.

The thickness of the substrate 101 is not particularly limited and may be, for example, 0.1 μm or more and 50 μm or less or 1 μm or more and 30 μm or less. When the thickness of the substrate 101 is 0.1 μm or more, since the strength of the substrate 101 is improved, the substrate 101 is prevented from being damaged. When the thickness of the substrate 101 is 50 μm or less, the electric resistance of the substrate 101 is reduced, and the battery can easily operate at high output.

Current Collector

The current collector 100 has, for example, a tabular shape. The thickness of the current collector 100 may be 0.1 μm or more and 1 mm or less. When the thickness of the current collector 100 is 0.1 μm or more, since the strength of the current collector 100 is improved, the current collector

100 is prevented from being damaged. When the thickness of the current collector 100 is 1 mm or less, the electric resistance of the electrode 1000 is reduced, and the battery can easily operate at high output. That is, the battery can be stably manufactured and also can operate at high output by appropriately adjusting the thickness of the current collector 100.

Method for Manufacturing Electrode

The electrode 1000 in Embodiment 1 can be produced by, for example, the following method. First, a dispersant containing a solid electrolyte 111, an active material 112, and a binder 113 for forming an active material layer 110 is prepared. A slurry obtained by dispersing a solid electrolyte 111, an active material 112, and a binder 113 in a solvent may be used as the dispersant. As the solvent, a solvent that does not react with the solid electrolyte 111, for example, an aromatic hydrocarbon solvent, such as toluene, can be used. Secondly, the dispersant is coated on the coating layer 102 of the current collector 100. Examples of the method for coating of the dispersant include a die coating method, a gravure coating method, a doctor blade method, a bar coating method, a spray coating method, and an electrostatic coating method. The obtained coated layer is dried to form an active material layer 110, and an electrode 1000 can be obtained. The method for drying the coated layer is not particularly limited. For example, the coated layer may be dried by heating at a temperature of 80° C. or more for 1 minute or more. The coated layer may be dried in a vacuum atmosphere or reduced-pressure atmosphere. A method for producing an active material layer 110 by coating a dispersant on a coating layer 102 may be called a wet coating method.

Embodiment 2

Embodiment 2 will now be described. Explanation that overlaps with the above-described Embodiment 1 is omitted as appropriate.

Figure 2:
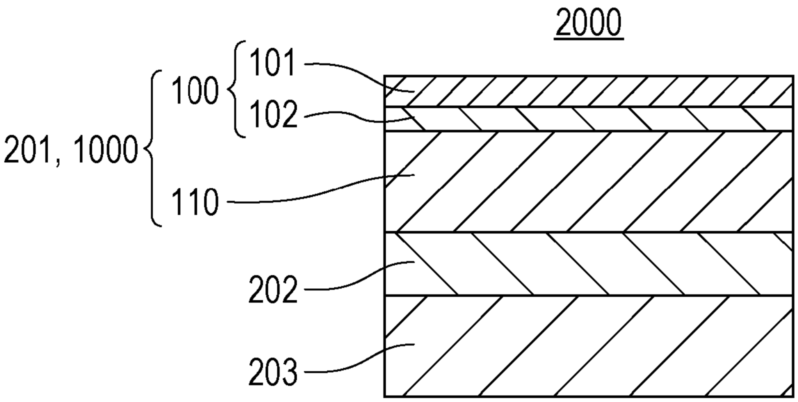
FIG. 2 shows a cross-sectional view of a battery according to Embodiment 2.

FIG. 2 shows a cross-sectional view of a battery 2000 according to Embodiment 2.

The battery 2000 in Embodiment 2 includes a positive electrode 201, a negative electrode 203, and an electrolyte layer 202.

At least one selected from the group consisting of the positive electrode 201 and the negative electrode 203 is the electrode 1000 in Embodiment 1 above. That is, at least one selected from the group consisting of the positive electrode 201 and the negative electrode 203 includes the active material layer 110 and the current collector 100 described in Embodiment 1.

The electrolyte layer 202 is located between the positive electrode 201 and the negative electrode 203.

The battery 2000 of Embodiment 2 can improve the output property due to the configuration above.

As shown in FIG. 2, in the battery 2000 in Embodiment 2, the positive electrode 201 may be the electrode 1000 in Embodiment 1 described above. In this case, the positive electrode 201 may include the active material layer 110 and the current collector 100 described in Embodiment 1. Hereinafter, a battery 2000 of which the positive electrode 201 is the electrode 1000 will be described. However, the battery 2000 of Embodiment 2 is not limited to the following configuration. In the battery 2000, the negative electrode 203 may be the electrode 1000 in Embodiment 1.

According to the configuration above, the output property of the battery 2000 can be more improved.

The electrolyte layer 202 is a layer containing an electrolyte material. Examples of the electrolyte material include a solid electrolyte. That is, the electrolyte layer 202 may be a solid electrolyte layer. As the solid electrolyte contained in the electrolyte layer 202, the solid electrolytes exemplified as the solid electrolyte 111 of Embodiment 1 may be used. For example, a sulfide solid electrolyte, an oxide solid electrolyte, a halide solid electrolyte, a polymer solid electrolyte, or a complex hydride solid electrolyte can be used. The solid electrolyte may be a halide solid electrolyte. A halide solid electrolyte has high thermal stability and therefore can improve the safety of the battery 2000.

The electrolyte layer 202 may contain a solid electrolyte as a main component. The electrolyte layer 202 may contain the solid electrolyte at a mass proportion of 70% or more (70 mass % or more) with respect to the total amount of the electrolyte layer 202.

According to the configuration above, the charge and discharge characteristics of the battery 2000 can be improved.

The electrolyte layer 202 contains a solid electrolyte as the main component and may further contain inevitable impurities or the starting materials, by-products, decomposition products when the solid electrolyte is synthesized, and so on.

The electrolyte layer 202 may contain the solid electrolyte at a mass proportion of 100% (100 mass %) with respect to the total amount of the electrolyte layer 202, except for inevitable impurities.

According to the configuration above, the charge and discharge characteristics of the battery 2000 can be more improved.

The electrolyte layer 202 may contain two or more of the materials mentioned as the solid electrolyte. For example, the electrolyte layer 202 may contain a halide solid electrolyte and a sulfide solid electrolyte.

The electrolyte layer 202 may have a thickness of 1 μm or more and 300 μm or less. When the thickness of the electrolyte layer 202 is 1 μm or more, the risk of short circuit between the positive electrode 201 and the negative electrode 203 is reduced. When the thickness of the electrolyte layer 202 is 300 μm or less, the battery 2000 can easily operate at high output. That is, the battery 2000 can sufficiently secure the safety and also can operate at high output by appropriately adjusting the thickness of the electrolyte layer 202.

The shape of the solid electrolyte included in the battery 2000 is not particularly limited. The shape of the solid electrolyte may be acicular, spherical, oval spherical, or the like. The shape of the solid electrolyte may be particulate.

The negative electrode 203 may include an electrolyte material, for example, a solid electrolyte. As the solid electrolyte, the solid materials exemplified as the material constituting the electrolyte layer 202 can be used. According to the configuration above, the ion conductivity (e.g., lithium ion conductivity) inside the negative electrode 203 is improved, and the battery 2000 can operate at high output.

The negative electrode 203 includes, for example, a material that has a property of occluding and releasing metal ions (for example, lithium ions) as the negative electrode active material. As the negative electrode active material, the materials exemplified in Embodiment 1 above may be used.

The negative electrode active material may have a median diameter of 0.1 μm or more and 100 μm or less. When the median diameter of the negative electrode active material is 0.1 μm or more, the negative electrode active material and the solid electrolyte can be well dispersed in the negative electrode 203. Consequently, the charge and discharge characteristics of the battery 2000 are improved. When the median diameter of the negative electrode active material is 100 μm or less, the lithium diffusion speed in the negative electrode active material is improved. Consequently, the battery 2000 can operate at high output.

The median diameter of the negative electrode active material may be larger than that of the solid electrolyte. Consequently, the solid electrolyte and the negative electrode active material can be well dispersed.

In the negative electrode 203, the volume ratio of the negative electrode active material and the solid electrolyte, "v2:(100−v2)", may satisfy $30 \leq v2 \leq 95$, where v2 indicates the volume ratio of the negative electrode active material when the total volume of the negative electrode active material and the solid electrolyte included in the negative electrode 203 is defined as 100. When $30 \leq v2$ is satisfied, the battery 2000 easily secures a sufficient energy density. When $v2 \leq 95$ is satisfied, the battery 2000 can more easily operate at high output.

The negative electrode 203 may have a thickness of 10 μm or more and 500 μm or less. When the thickness of the negative electrode 203 is 10 μm or more, the battery 2000 can easily secure a sufficient energy density. When the thickness of the negative electrode 203 is 500 μm or less, the battery 2000 can more easily operate at high output.

The negative electrode active material may be coated by a coating material for reducing the interface resistance with the solid electrolyte. As the coating material, a material having low electron conductivity can be used. As the coating material, an oxide material, an oxide solid electrolyte, or the like can be used. As the coating material, the materials exemplified in Embodiment 1 above may be used.

At least one selected from the group consisting of the electrolyte layer 202 and the negative electrode 203 may include a binding agent for the purpose of improving the adhesion between particles. As the binding agent, the materials exemplified in Embodiment 1 can be used.

As the binding agent, an elastomer may be used from the viewpoint of excellent binding properties. As the elastomer, the materials exemplified in Embodiment 1 can be used. As the binding agent, two or more selected from these binding agents may be used. When the binding agent includes a thermoplastic elastomer, for example, high loading of the electrolyte layer 202 or the negative electrode 203 can be achieved by thermocompression during the manufacturing of the battery 2000.

In the positive electrode 201, the binder 113 of the active material layer 110 may or may not further include the above-mentioned binding agent, in addition to the above-described block copolymer.

At least one selected from the group consisting of the active material layer 110 of the positive electrode 201, the electrolyte layer 202, and the negative electrode 203 may include a nonaqueous electrolytic solution, a gel electrolyte, or an ionic liquid for the purpose of facilitating the transfer of lithium ions and improving the output property of the battery 2000.

The nonaqueous electrolytic solution contains a nonaqueous solvent and a lithium salt dissolved in the nonaqueous solvent. As the nonaqueous solvent, for example, a cyclic carbonate solvent, a chain carbonate solvent, a cyclic ether solvent, a chain ether solvent, a cyclic ester solvent, a chain ester solvent, or a fluorine solvent can be used. Examples of the cyclic carbonate solvent include ethylene carbonate, propylene carbonate, and butylene carbonate. Examples of the chain carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorine solvent include fluoroethylene carbonate, methyl fluoropropionate, fluorobenzene, fluoroethyl methyl carbonate, and fluorodimethylene carbonate. As the nonaqueous solvent, one nonaqueous solvent selected from these solvents may be used alone, or a mixture of two or more nonaqueous solvents selected from these solvents may be used.

The nonaqueous electrolytic solution may include at least one fluorine solvent selected from the group consisting of fluoroethylene carbonate, methyl fluoropropionate, fluorobenzene, fluoroethyl methyl carbonate, and fluorodimethylene carbonate.

Examples of the lithium salt include $LiPF_6$, $LiBF_4$, $LiSbF_6$, $LiAsF_6$, $LiSO_3CF_3$, $LiN(SO_2F)_2$, $LiN(SO_2CF_3)_2$, $LiN(SO_2C_2F_5)_2$, $LiN(SO_2CF_3)(SO_2C_4F_9)$, and $LiC(SO_2CF_3)_3$.

As the lithium salt, one lithium salt selected from these salts may be used alone, or a mixture of two or more lithium salts selected from these salts may be used. The concentration of the lithium salt in the nonaqueous electrolytic solution may be 0.5 mol/L or more and 2 mol/L or less.

As the gel electrolyte, a material obtained by impregnating a polymer material with a nonaqueous electrolytic solution can be used. Examples of the polymer material include polyethylene oxide, polyacrylonitrile, polyvinylidene fluoride, polymethyl methacrylate, and a polymer having an ethylene oxide bond.

The cation constituting the ionic liquid may be, for example, an aliphatic chain quaternary cation such as tetraalkylammonium and tetraalkylphosphonium, an aliphatic cyclic ammonium such as a pyrrolidinium, a morpholinium, an imidazolinium, a tetrahydropyrimidinium, a piperazinium, and a piperidinium, or a nitrogen-containing heterocyclic aromatic cation such as a pyridinium and an imidazolium. The anion constituting the ionic liquid may be, for example, $PF_6^-$, $BF_4^-$, $SbF_6^-$, $AsF_6^-$, $SO_3CF_3^-$, $N(SO_2F)_2^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may contain a lithium salt.

At least one selected from the group consisting of the active material layer 110 of the positive electrode 201 and the negative electrode 203 may include a conductive assistant for the purpose of improving the electron conductivity. Examples of the conductive assistant include graphite such as natural graphite and artificial graphite, carbon black such as acetylene black and Ketjen black, conductive fibers such as carbon fibers and metal fibers, conductive powders such as fluorinated carbon and aluminum, conductive whiskers such as zinc oxide and potassium titanate, conductive metal oxides such as titanium oxide, and conductive polymers such as polyaniline, polypyrrole, and polythiophene. The cost can be reduced by using a carbon material as the conductive assistant.

Examples of the shape of the battery 2000 include a coin type, a cylindrical type, a square type, a sheet type, a button type, a flat type, and a stacked type.

The battery 2000 in Embodiment 2 can be manufactured by, for example, the following method. First, a current collector 100, a material for forming the active material layer 110, a material for forming the electrolyte layer 202, a material for forming the negative electrode 203, and a current collector for the negative electrode 203 are provided.

Using these materials, a stack composed of a positive electrode 201, an electrolyte layer 202, and a negative electrode 203 disposed in this order is produced by a known method. Consequently, a battery 2000 can be manufactured.

EXAMPLES

The present disclosure will now be described in detail using Examples and Comparative Examples. The electrode and battery of the present disclosure are not limited to the following Examples.

Example 1-1

Production of Halide Solid Electrolyte $YCl_3$, LiCl, and LiBr as raw material powders were weighed at a molar ratio of $YCl_3$:LiCl:LiBr of 1:1:2 in an argon glove box having a dew point of −60° C. or less. Subsequently, these raw material powders were mixed. The obtained mixture was heat-treated at 520° C. for 2 hours using an electric furnace to obtain $Li_3YBr_2Cl_4$ (hereinafter, referred to as "LYBC") as a halide solid electrolyte.

Solvent

In all steps below, a commercially available dehydrated solvent or a solvent dehydrated by nitrogen bubbling was used as a solvent. The amount of moisture in the solvent was 10 mass ppm or less.

Production of Binder Solution

A binder solution was prepared by adding a solvent to a binder and dissolving or dispersing the binder in the solvent. The concentration of the binder in the binder solution was adjusted to 5 mass % or more and 6 mass % or less. Subsequently, dehydration by nitrogen bubbling was performed until the amount of moisture in the binder solution reached 10 mass ppm or less.

In Example 1-1, p-chlorotoluene was used as the solvent of the binder solution.

As the block copolymer constituting the binder, a hydrogenated styrene-based thermoplastic elastomer, SEBS (manufactured by Asahi Kasei Corporation, Tuftec (registered trademark) N504), was used. In this SEBS, the molar fraction of the repeating unit having an aromatic ring was 0.21.

Production of Electrode

LYBC was pulverized using a dry jet mill grinder in a dry room having a dew point of −40° C. or less to obtain a pulverized powder of LYBC. Subsequently, the LYBC and a binder were mixed by dropwise addition of the binder solution in an argon glove box having a dew point of −60° C. or less. On this occasion, LYBC and SEBS were mixed at a mass ratio of LYBC:SEBS of 100:3. Furthermore, p-chlorotoluene was added to the obtained mixture to adjust the solid content concentration to 56 mass %. Subsequently, the mixture was kneaded using a rotation-revolution mixer (manufactured by THINKY Corporation, ARE-310) under conditions of 1600 rpm for 3 minutes to produce a slurry. Subsequently, aluminum alloy foil (AlN30 foil, thickness: 15 μm) was coated with carbon black to produce a current collector including a coating layer. The slurry was applied onto this coating layer of the current collector, and the obtained coated layer was dried in a vacuum atmosphere at 100° C. for 1 hour to produce an electrode of Example 1-1.

Example 1-2

An electrode of Example 1-2 was produced by the same method as in Example 1-1 except that SEEPS (manufactured by Kuraray Co., Ltd., SEPTON (registered trademark) 4099) was used as the block copolymer constituting the binder. In SEEPS used in Example 1-2, the molar fraction of the repeating unit having an aromatic ring was 0.21.

Example 1-3

An electrode of Example 1-3 was produced by the same method as in Example 1-1 except that SEPS (manufactured by Kuraray Co., Ltd., SEPTON (registered trademark) 2006) was used as the block copolymer constituting the binder. In SEPS used in Example 1-3, the molar fraction of the repeating unit having an aromatic ring was 0.24.

Example 1-4

An electrode of Example 1-4 was produced by the same method as in Example 1-1 except that SBS (manufactured by Asahi Kasei Corporation, Asaprene (registered trademark) T-411) was used as the block copolymer constituting the binder. In SBS used in Example 1-4, the molar fraction of the repeating unit having an aromatic ring was 0.17.

Comparative Example 1-1

An electrode of Comparative Example 1-1 was produced by the same method as in Example 1-1 except that aluminum alloy foil (AlN30 foil, thickness: 15 μm) was used as the current collector.

Comparative Example 1-2

An electrode of Comparative Example 1-2 was produced by the same method as in Example 1-1 except that SEBS (manufactured by JSR Corporation, DYNARON (registered trademark) 8903P) was used as the block copolymer constituting the binder. In SEBS used in Comparative Example 1-2, the molar fraction of the repeating unit having an aromatic ring was 0.22.

Comparative Example 1-3

An electrode of Comparative Example 1-3 was produced by the same method as in Example 1-1 except that SBR (manufactured by Asahi Kasei Corporation, Tufdene (registered trademark) 2100R) was used as the polymer constituting the binder. SBR was a random copolymer.

Measurement of weight average molecular weight of block copolymer, molar fraction of repeating unit having aromatic ring in block copolymer, and average degree of polymerization of first block of block copolymer The weight average molecular weight and so on of the block copolymer constituting a binder were measured by gel permeation chromatography (GPC) measurement with a high-performance GPC apparatus (HLC-832-GPC manufactured by TOSOH Corporation). The measurement sample used was prepared by dissolving the binder in chloroform and then performing filtration with a filter with a pore size of 0.2 m.

As the column, two Super HM-H manufactured by TOSOH Corporation were used. GPC measurement used a refractive index detector (RI). The GPC measurement was performed under conditions of a flow rate of 0.6 mL/min and a column temperature of 40° C. As a standard sample, monodispersed polystyrene (TOSOH Corporation) was used. The number average molecular weight ($M_n$), weight average molecular weight ($M_w$), and degree of dispersion ($M_w/M_n$) of the block copolymer were specified by the GPC measurement.

The molar fraction of the repeating unit having an aromatic ring in each of the block copolymers used in Examples 1-1 to 1-4 and Comparative Examples 1-1 and 1-2 was specified by the following method. First, a measurement sample containing a block copolymer was subjected to proton nuclear magnetic resonance ($^1$H NMR) measurement with a nuclear magnetic resonance apparatus (AVANCE 500, manufactured by Bruker Corporation). The measurement sample was prepared by dissolving the block copolymer in $CDCl_3$. $CDCl_3$ included 0.05% of TMS. $^1$H NMR measurement was performed under conditions of a resonance frequency of 500 MHz and a measurement temperature of 23° C. From the obtained NMR spectrum, an integrated value of the peak derived from a styrene skeleton and integrated values of the peaks derived from skeletons other than the styrene skeleton were specified. The molar fraction of the repeating unit having an aromatic ring in the block copolymer was specified using the specified integrated values.

Regarding the block copolymers used in Examples 1-1 to 1-4 and Comparative Examples 1-1 and 1-2, the average degree of polymerization of the block (first block) constituted of the repeating unit having an aromatic ring was calculated based on the number average molecular weight ($M_n$), the molar fraction (φ) of the repeating unit having an aromatic ring, the molecular weight ($M_1$) of the repeating unit having an aromatic ring, and the molecular weight ($M_2$) of the repeating unit constituting the second block, by the following Expression (i):

[Math 2]

$$\text{Average degree of polymerization of first block} = \frac{M_n \times \varphi}{M_1 \times \varphi + M_2 \times (1-\varphi)} \times \frac{1}{2} \quad \text{(i)}$$

Measurement of Peel Strength

The peel strength of the electrodes of Examples 1-1 to 1-4 and Comparative Examples 1-1 to 1-3 was measured by the following method.

The peel strength was measured with a desktop tension-compression testing machine (MCT-2150, manufactured by A&D Co., Ltd.) in a dry room having a dew point of −40° C. or less by the following method. First, an electrode cut to a width of 15 mm and a UNILATE (registered trademark) plate were attached with a double-sided tape. Specifically, the active material layer of an electrode was bonded to a UNILATE plate through double-sided tape. Secondly, the current collector was peeled off from the active material layer fixed to the UNILATE plate using a testing machine at a peel angle of 90° and a peel rate of 10 mm/min. After the start of measurement, the measured values for the first 2 mm length peeled off from the current collector were ignored, and then the average value of the measured values (unit: N) continuously recorded for 8 mm length of the active material layer peeled off from the current collector was specified. This average value was divided by the width of the electrode, and the resulting value was recognized as a peel strength (unit: N/m) between the active material layer and the current collector.

The results of the measurement above are shown in Table 1. The types A to F of the binders in Table 1 respectively correspond to the following polymers:

A: hydrogenated styrene-based thermoplastic elastomer (SEBS) Tuftec N504;

B: hydrogenated styrene-based thermoplastic elastomer (SEEPS) SEPTON 4099;

C: hydrogenated styrene-based thermoplastic elastomer (SEPS) SEPTON 2006;

D: styrene-based thermoplastic elastomer (SBS) Asaprene T-411;

E: hydrogenated styrene-based thermoplastic elastomer (SEBS) DYNARON 8903P; and

F: styrene-based elastomer (SBR) Tufdene 2100R.

TABLE 1

| | | Polymer constituting binder | | | | | |
|---|---|---|---|---|---|---|---|
| | Material of coating layer | Type | Arrangement | Weight average molecular weight ($M_w$) | Degree of dispersion ($M_w/M_n$) | Average degree of polymerization of first block | Peel strength ($Nm^{-1}$) |
| Example 1-1 | Carbon black | A | Triblock | 235,000 | 1.32 | 280 | 15.3 |
| Example 1-2 | Carbon black | B | Triblock | 422,000 | 1.36 | 460 | 24.3 |
| Example 1-3 | Carbon black | C | Triblock | 178,000 | 1.28 | 210 | 8.5 |
| Example 1-4 | Carbon black | D | Triblock | 240,000 | 1.58 | 210 | 7.9 |
| Comparative Example 1-1 | None | A | Triblock | 235,000 | 1.32 | 280 | 6.2 |
| Comparative Example 1-2 | Carbon black | E | Triblock | 158,000 | 1.45 | 180 | 2.0 |
| Comparative Example 1-3 | Carbon black | F | Random | 386,000 | 2.52 | — | 5.2 |

As obvious from Table 1, when a block copolymer having an arrangement of triblock was used as a binder and carbon black was used as a material for the coating layer, the weight average molecular weight ($M_w$) of the block copolymer correlated with the peel strength. In particular, in the electrodes including a block copolymer having an $M_w$ of 170,000 or more of Examples, the peel strength between the active material layer and the current collector layer was high. This result demonstrates that electrodes of Examples are suitable for improving the peel strength between an active material layer and a current collector.

Example 2-1

Production of Dispersion of Halide Solid Electrolyte

In a dry room having a dew point of −40° C. or less, p-chlorotoluene was added to LYBC. LYBC was pulverized and dispersed in the solvent using a wet fine grinding and dispersing device of a bead mill machine to obtain an LYBC dispersion. The solid content concentration in the LYBC dispersion was 35 mass %.

Production of Active Material

First, $Li(Ni,Co,M_n)O_2$ coated with $LiNbO_3$ was provided. Secondly, in an argon glove box having a dew point of −60° C. or less, $LiNbO_3$-coated $Li(Ni,Co,M_n)O_2$, the LYBC dispersion, vapor grown carbon fiber (VGCF), and p-chlorotoluene were weighed at a mass ratio of $LiNbO_3$-coated $Li(Ni,Co,M_n)O_2$:LYBC:VGCF of 100:7.5:0.41. Subsequently, these materials were kneaded using a desktop kneader to produce an active material. In the active material, $Li(Ni,Co,M_n)O_2$ was coated with LYBC and $LiNbO_3$.

Production of Electrode Mixture

The active material above, LYBC, a sulfide solid electrolyte $Li_2S—P_2S_5$ glass ceramics (LPS), and VGCF were weighed at a mass ratio of active material:LYBC:LPS:VGCF of 85.0:6.4:8.6:1 in an argon glove box having a dew point of −60° C. or less. These materials were mixed in an agate mortar to produce an electrode mixture.

Production of Electrode

A binder solution was dropwise added to the electrode mixture in an argon glove box having a dew point of −60° C. or less to mix them. As the block copolymer constituting the binder, a hydrogenated styrene-based thermoplastic elastomer SEBS (manufactured by Asahi Kasei Corporation, Tuftec (registered trademark) N504) was used. The binder solution and the electrode mixture were mixed at a mass ratio of (LYBC+LPS):SEBS of 100:2.7. A xylene mixture was further added to the obtained mixture to adjust the solid content concentration to 80 mass %. The xylene mixture was a mixed solvent containing o-xylene, m-xylene, p-xylene, and ethylbenzene of 24:42:18:16. Subsequently, the mixture was kneaded using a rotation-revolution mixer (manufactured by THINKY Corporation, ARE-310) under conditions of 1,600 rpm for 3 minutes to produce a slurry. Subsequently, aluminum alloy foil (A3003 foil, thickness: 15 μm) was coated with carbon black to produce a current collector including a coating layer. The slurry was applied onto this coating layer of the current collector, and the obtained coated layer was dried in a vacuum atmosphere at 100° C. for 1 hour to produce an electrode of Example 2-1.

Example 2-2

An electrode of Example 2-2 was produced by the same method as in Example 2-1 except that the binder solution and the electrode mixture were mixed at a molar ratio of (LYBC+LPS):SEBS of 100:5.3.

Comparative Example 2-1

An electrode of Comparative Example 2-1 was produced by the same method as in Example 2-1 except that SBR (manufactured by Asahi Kasei Corporation, Tufdene (registered trademark) 2100R) was used as the polymer constituting the binder. SBR was a random copolymer.

Comparative Example 2-2

An electrode of Comparative Example 2-2 was produced by the same method as in Comparative Example 2-1 except that the binder solution and the electrode mixture were mixed at a mass ratio of (LYBC+LPS):SEBS of 100:5.3.

Measurement of Peel Strength

Regarding the electrodes of Examples 2-1 and 2-2 and Comparative Examples 2-1 and 2-2, the peel strength was measured by the method above.

The results of the measurement above are shown in Table 2. The types A and F of the resin binders in Table 2 respectively correspond to the following polymers: A: hydrogenated styrene-based thermoplastic elastomer (SEBS) Tuftec N504; and F: styrene-based elastomer (SBR) Tufdene 2100R.

TABLE 2

| | | Polymer constituting binder | | | | | |
|---|---|---|---|---|---|---|---|
| | Material of coating layer | Type | Arrangement | Weight average molecular weight ($M_w$) | Average degree of polymerization of first block | Ratio of binder to solid electrolyte (wt %) | Peel strength ($Nm^{-1}$) |
| Example 2-1 | Carbon black | A | Triblock | 235,000 | 280 | 2.7 | 1.7 |
| Example 2-2 | Carbon black | A | Triblock | 235,000 | 280 | 5.3 | 4.4 |
| Comparative Example 2-1 | Carbon black | F | Random | 386,000 | — | 2.7 | 1.1 |
| Comparative Example 2-2 | Carbon black | F | Random | 386,000 | — | 5.3 | 3.0 |

It is demonstrated from Table 2 that the peel strength between the active material layer and the current collector layer was improved in the electrode of Example 2-1 compared to the electrode of Comparative Example 2-1 in which the ratio of the binder to the solid electrolyte was the same as that in the electrode of Example 2-1. Similarly, it is demonstrated that the peel strength between the active material layer and the current collector layer was improved in the electrode of Example 2-2 compared to the electrode of Comparative Example 2-2 in which the ratio of the binder to the solid electrolyte was the same as that in the electrode of Example 2-2. As obvious from Table 2, when a block copolymer having an arrangement of triblock and having a weight average molecular weight of 170,000 or more was used as the binder and carbon black was used as a material for the coating layer, the peel strength between the active material layer and the current collector layer was improved. This result demonstrates that the electrodes of Examples are suitable for improving the peel strength between the active material layer and the current collector.

Consideration

The comparison between the results of Example 1-1 and the results of Comparative Example 1-1 shown in Table 1 demonstrates that when conductive carbon is used as the material for the coating layer, the peel strength between the active material layer and the current collector layer is improved.

The comparison between the results of Examples 1-1 to 1-4 and the results of Comparative Examples 1-2 and 1-3 shown in Table 1 demonstrates that when a block copolymer having an arrangement of triblock and having a weight average molecular weight of 170,000 or more is used as the binder, the peel strength between the active material layer and the current collector layer is improved.

From the above, it was confirmed that the electrode of the present disclosure is suitable for suppressing the peeling between the active material layer and the current collector. The electrode of the present disclosure is an electrode including an active material layer that contains an active material, a solid electrolyte, and a binder and a current collector that includes a substrate and a coating layer that coats the substrate and is in contact with the active material layer. The binder includes a block copolymer including two first blocks constituted of a repeating unit having an aromatic ring and a second block located between the two first blocks. The block copolymer has a weight average molecular weight of 170,000 or more, and the coating layer contains conductive carbon.

The electrode of the present disclosure can be used in, for example, an all-solid-state lithium ion secondary battery.

What is claimed is:

1. An electrode comprising: an active material layer containing an active material, a solid electrolyte, and a binder; and a current collector including a substrate and a coating layer that coats the substrate and is in contact with the active material layer, wherein the binder includes a block copolymer that includes two first blocks constituted of a repeating unit having an aromatic ring and a second block located between the two first blocks, the block copolymer has a weight average molecular weight of 170,000 or more, the coating layer contains conductive carbon and wherein the first block has an average degree of polymerization of 210 or more.

2. The electrode according to claim 1, wherein the second block includes a repeating unit derived from a conjugated diene.

3. The electrode according to claim 1, wherein the block copolymer is a triblock copolymer, and the repeating unit having the aromatic ring includes a repeating unit derived from styrene.

4. The electrode according to claim 3, wherein the block copolymer is a hydrogenated product.

5. The electrode according to claim 1, wherein the block copolymer includes at least one selected from the group consisting of a styrene-ethylene/butylene-styrene block copolymer (SEBS), a styrene-ethylene/propylene-styrene block copolymer (SEPS), and a styrene-ethylene/ethylene/propylene-styrene block copolymer (SEEPS).

6. The electrode according to claim 1, wherein the substrate includes aluminum or an aluminum alloy.

7. The electrode according to claim 1, wherein the active material includes a lithium-containing transition metal oxide.

8. The electrode according to claim 7, wherein the active material includes lithium nickel cobalt manganese oxide.

9. A battery comprising:

a positive electrode;

a negative electrode; and an electrolyte layer located between the positive electrode and the negative electrode, wherein at least one selected from the group consisting of the positive electrode and the negative electrode is the electrode according to claim 1.

10. The battery according to claim 9, wherein the positive electrode is the electrode according to claim 1.

* * * * *